United States Patent
Zhu et al.

(10) Patent No.: US 12,550,068 B2
(45) Date of Patent: Feb. 10, 2026

(54) CONFIGURING UPLINK TRANSMISSION CONFIGURATION INDICATION POWER CONTROL PARAMETERS

(71) Applicant: LENOVO (BEIJING) LIMITED, Beijing (CN)

(72) Inventors: Chenxi Zhu, Fairfax, VA (US); Bingchao Liu, Beijing (CN); Wei Ling, Beijing (CN); Yi Zhang, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 452 days.

(21) Appl. No.: 18/019,133

(22) PCT Filed: Aug. 6, 2020

(86) PCT No.: PCT/CN2020/107453
§ 371 (c)(1),
(2) Date: Feb. 1, 2023

(87) PCT Pub. No.: WO2022/027456
PCT Pub. Date: Feb. 10, 2022

(65) Prior Publication Data
US 2023/0284149 A1    Sep. 7, 2023

(51) Int. Cl.
*H04W 52/14* (2009.01)
*H04W 16/28* (2009.01)
*H04W 52/08* (2009.01)

(52) U.S. Cl.
CPC ......... *H04W 52/146* (2013.01); *H04W 16/28* (2013.01); *H04W 52/08* (2013.01)

(58) Field of Classification Search
CPC ..... H04W 52/32; H04W 52/36; H04W 16/28; H04W 52/08; H04W 52/34; H04W 56/00;
(Continued)

(56) References Cited

U.S. PATENT DOCUMENTS

| | | | |
|---|---|---|---|
| 2019/0159136 A1 | 5/2019 | MolavianJazi et al. | |
| 2020/0266867 A1* | 8/2020 | Park | H04L 1/0681 |
| 2021/0195530 A1* | 6/2021 | Venugopal | H04W 52/32 |

FOREIGN PATENT DOCUMENTS

| CN | 111093257 A | 5/2020 |
|---|---|---|
| CN | 111277395 A | 6/2020 |

OTHER PUBLICATIONS

International Searching Authority, "Written Opinion of the International Searching Authority," PCT/CN2020/107453, Apr. 28, 2021, pp. 1-4.

(Continued)

*Primary Examiner* — Tu X Nguyen
(74) *Attorney, Agent, or Firm* — Kunzler Needham & Hilton

(57) ABSTRACT

Apparatuses, methods, and systems are disclosed for configuring UL-TCI power control parameters. One method (400) includes receiving (402) an RRC message configuring a set of UL-TCI power control parameter groups. Each UL-TCI power control parameter group defines a group of power control parameters used to calculate an uplink transmission power. The method (400) includes receiving (404) DCI scheduling a codebook-based PUSCH transmission. The DCI comprises an UL-TCI field indicating at least one spatial domain transmission filter for the codebook-based PUSCH transmission. The method (400) includes determining (406) power control parameters for the codebook-based PUSCH transmission based on an UL-TCI power control parameter group of the set of UL-TCI power control parameter groups that corresponds to the UL-TCI field. The method (400) includes transmitting (408) the codebook-based PUSCH with a transmission power determined based on the power control parameters.

18 Claims, 5 Drawing Sheets

(58) Field of Classification Search
CPC . H04W 52/06; H04W 72/121; H04W 52/146; H04W 52/242; H04W 52/10; H04W 52/54
See application file for complete search history.

(56) References Cited

OTHER PUBLICATIONS

ZTE, Preliminary views on further enhancement for NR MIMO, 3GPP TSG RAN WG1 Meeting #101-e, R1-2003483, May 25-Jun. 5, 2020, pp. 1-18, e-Meeting.

* cited by examiner

CONFIGURING UPLINK TRANSMISSION CONFIGURATION INDICATION POWER CONTROL PARAMETERS

FIELD

The subject matter disclosed herein relates generally to wireless communications and more particularly relates to configuring uplink transmission configuration indication power control parameters.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Aperiodic ("AP"), Backhaul ("BH"), Broadcast Multicast ("BM"), Buffer Occupancy ("BO"), Base Station ("BS"), Buffer Status Report ("BSR"), Bandwidth ("BW"), Bandwidth Part ("BWP"), Carrier Aggregation ("CA"), Code Block Group ("CBG"), CBG Flushing Out Information ("CBGFI"), CBG Transmission Information ("CBGTI"), Component Carrier ("CC"), Code Division Multiplexing ("CDM"), Control Element ("CE"), Coordinated Multipoint ("CoMP"), Categories of Requirements ("CoR"), Control Resource Set ("CORESET"), Cyclic Prefix ("CP"), Cyclic Prefix OFDM ("CP-OFDM"), Cyclic Redundancy Check ("CRC"), CSI-RS Resource Indicator ("CRI"), Cell RNTI ("C-RNTI"), Channel State Information ("CSI"), CSI IM ("CSI-IM"), CSI RS ("CSI-RS"), Channel Quality Indicator ("CQI"), Central Unit ("CU"), Codeword ("CW"), Downlink Assignment Index ("DAI"), Downlink Control Information ("DCI"), Downlink Feedback Information ("DFI"), Downlink ("DL"), Discrete Fourier Transform Spread OFDM ("DFT-s-OFDM"), Demodulation Reference Signal ("DMRS" or "DM-RS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiplexing ("FDM"), Frequency Division Multiple Access ("FDMA"), Frequency Range ("FR"), 450 MHz-6000 MHz ("FR1"), 24250 MHz-52600 MHz ("FR2"), Hybrid Automatic Repeat Request ("HARQ"), High-Definition Multimedia Interface ("HDMI"), High-Speed Train ("HST"), Integrated Access Backhaul ("IAB"), Identity or Identifier or Identification ("ID"), Information Element ("IE"), Interference Measurement ("IM"), International Mobile Subscriber Identity ("IMSI"), Internet-of-Things ("IoT"), Internet Protocol ("IP"), Joint Transmission ("JT"), Level 1 ("L1"), L1 RSRP ("L1-RSRP"), L1 SINR ("L1-SINR"), Logical Channel ("LCH"), Logical Channel Group ("LCG"), Logical Channel ID ("LCID"), Logical Channel Prioritization ("LCP"), Layer Indicator ("LI"), Least-Significant Bit ("LSB"), Long Term Evolution ("LTE"), Levels of Automation ("LoA"), Medium Access Control ("MAC"), Modulation Coding Scheme ("MCS"), Multi DCI ("M-DCI"), Master Information Block ("MIB"), Multiple Input Multiple Output ("MIMO"), Maximum Permissible Exposure ("MPE"), Most-Significant Bit ("MSB"), Mobile-Termination ("MT"), Machine Type Communication ("MTC"), Multi PDSCH ("Multi-PDSCH"), Multi TRP ("M-TRP"), Multi-User ("MU"), Multi-User MIMO ("MU-MIMO"), Minimum Mean Square Error ("MMSE"), Negative-Acknowledgment ("NACK") or ("NAK"), Non-Coherent Joint Transmission ("NCJT"), Next Generation ("NG"), Next Generation Node B ("gNB"), New Radio ("NR"), Non-Zero Power ("NZP"), NZP CSI-RS ("NZP-CSI-RS"), Orthogonal Frequency Division Multiplexing ("OFDM"), Peak-to-Average Power Ratio ("PAPR"), Physical Broadcast Channel ("PBCH"), Physical Downlink Control Channel ("PDCCH"), Physical Downlink Shared Channel ("PDSCH"), PDSCH Configuration ("PDSCH-Config"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), ProSe Per Packet Priority ("PPPP"), ProSe Per Packet Reliability ("PPPR"), Physical Resource Block ("PRB"), Packet Switched ("PS"), Physical Sidelink Control Channel ("PSCCH"), Physical Sidelink Shared Channel ("PSSCH"), Phase Tracking RS ("PTRS" or "PT-RS"), Physical Uplink Control Channel ("PUCCH"), Physical Uplink Shared Channel ("PUSCH"), Quasi Co-Located ("QCL"), Quality of Service ("QoS"), Random Access Channel ("RACH"), Radio Access Network ("RAN"), Radio Access Technology ("RAT"), Resource Element ("RE"), Radio Frequency ("RF"), Rank Indicator ("RI"), Radio Link Control ("RLC"), Radio Link Failure ("RLF"), Radio Network Temporary Identifier ("RNTI"), Resource Pool ("RP"), Radio Resource Control ("RRC"), Remote Radio Head ("RRH"), Reference Signal ("RS"), Reference Signal Received Power ("RSRP"), Reference Signal Received Quality ("RSRQ"), Redundancy Version ("RV"), Receive ("RX"), Single Carrier Frequency Domain Spread Spectrum ("SC-FDSS"), Secondary Cell ("SCell"), Spatial Channel Model ("SCM"), Sub Carrier Spacing ("SCS"), Single DCI ("S-DCI"), Spatial Division Multiplexing ("SDM"), Service Data Unit ("SDU"), Single Frequency Network ("SFN"), Subscriber Identity Module ("SIM"), Signal-to-Interference Ratio ("SINR"), Sidelink ("SL"), Sequence Number ("SN"), Semi Persistent ("SP"), Scheduling Request ("SR"), SRS Resource Indicator ("SRI"), Sounding Reference Signal ("SRS"), Synchronization Signal ("SS"), SS/PBCH Block ("SSB"), Transport Block ("TB"), Transmission Configuration Indication ("TCI"), Time Division Duplex ("TDD"), Time Division Multiplexing ("TDM"), Temporary Mobile Subscriber Identity ("TMSI"), Transmit Power Control ("TPC"), Transmitted Precoding Matrix Indicator ("TPMI"), Transmission Reception Point ("TRP"), Technical Standard ("TS"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), LTE Radio Interface ("Uu interface"), User Plane ("UP"), Ultra Reliable Low Latency Communication ("URLLC"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), Virtual Resource Block ("VRB"), Vehicle RNTI ("V-RNTI"), Worldwide Interoperability for Microwave Access ("WiMAX"), Zero Forcing ("ZF"), Zero Power ("ZP"), and ZP CSI-RS ("ZP-CSI-RS"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, power control may be performed.

BRIEF SUMMARY

Methods for configuring uplink transmission configuration indication power control parameters are disclosed.

Apparatuses and systems also perform the functions of the methods. In one embodiment, the method includes receiving, at a user equipment, a radio resource control message configuring a set of uplink transmission configuration indication power control parameter groups, wherein each uplink transmission configuration indication power control parameter group of the set of uplink transmission configuration indication power control parameter groups defines a group of power control parameters used to calculate an uplink transmission power. In some embodiments, the method includes receiving downlink control information scheduling a codebook-based physical uplink shared channel transmission, wherein the downlink control information comprises an uplink transmission configuration indication field indicating at least one spatial domain transmission filter for the codebook-based physical uplink shared channel transmission. In certain embodiments, the method includes determining power control parameters for the codebook-based physical uplink shared channel transmission based on an uplink transmission configuration indication power control parameter group of the set of uplink transmission configuration indication power control parameter groups that corresponds to the uplink transmission configuration indication field. In various embodiments, the method includes transmitting the codebook-based physical uplink shared channel transmission with a transmission power determined based on the power control parameters.

An apparatus for configuring uplink transmission configuration indication power control parameters, in one embodiment, includes a receiver that receives a radio resource control message configuring a set of uplink transmission configuration indication power control parameter groups, wherein each uplink transmission configuration indication power control parameter group of the set of uplink transmission configuration indication power control parameter groups defines a group of power control parameters used to calculate an uplink transmission power; and receives downlink control information scheduling a codebook-based physical uplink shared channel transmission, wherein the downlink control information comprises an uplink transmission configuration indication field indicating at least one spatial domain transmission filter for the codebook-based physical uplink shared channel transmission. In some embodiments, the apparatus includes a processor that determines power control parameters for the codebook-based physical uplink shared channel transmission based on an uplink transmission configuration indication power control parameter group of the set of uplink transmission configuration indication power control parameter groups that corresponds to the uplink transmission configuration indication field. In various embodiments, the apparatus includes a transmitter that transmits the codebook-based physical uplink shared channel transmission with a transmission power determined based on the power control parameters.

A method for configuring uplink transmission configuration indication power control parameters includes transmitting, to a user equipment, a radio resource control message configuring a set of uplink transmission configuration indication power control parameter groups, wherein each uplink transmission configuration indication power control parameter group of the set of uplink transmission configuration indication power control parameter groups defines a group of power control parameters used to calculate an uplink transmission power. In some embodiments, the method includes transmitting downlink control information scheduling a codebook-based physical uplink shared channel transmission, wherein the downlink control information comprises an uplink transmission configuration indication field indicating at least one spatial domain transmission filter for the codebook-based physical uplink shared channel transmission, and the user equipment determines power control parameters for the codebook-based physical uplink shared channel transmission based on an uplink transmission configuration indication power control parameter group of the set of uplink transmission configuration indication power control parameter groups that corresponds to the uplink transmission configuration indication field. In certain embodiments, the method includes receiving the codebook-based physical uplink shared channel transmission with a transmission power determined based on the power control parameters.

An apparatus for configuring uplink transmission configuration indication power control parameters, in one embodiment, includes a transmitter that transmits, to a user equipment, a radio resource control message configuring a set of uplink transmission configuration indication power control parameter groups, wherein each uplink transmission configuration indication power control parameter group of the set of uplink transmission configuration indication power control parameter groups defines a group of power control parameters used to calculate an uplink transmission power; and transmits downlink control information scheduling a codebook-based physical uplink shared channel transmission, wherein the downlink control information comprises an uplink transmission configuration indication field indicating at least one spatial domain transmission filter for the codebook-based physical uplink shared channel transmission, and the user equipment determines power control parameters for the codebook-based physical uplink shared channel transmission based on an uplink transmission configuration indication power control parameter group of the set of uplink transmission configuration indication power control parameter groups that corresponds to the uplink transmission configuration indication field. In some embodiments, the apparatus includes a receiver that receives the codebook-based physical uplink shared channel transmission with a transmission power determined based on the power control parameters.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
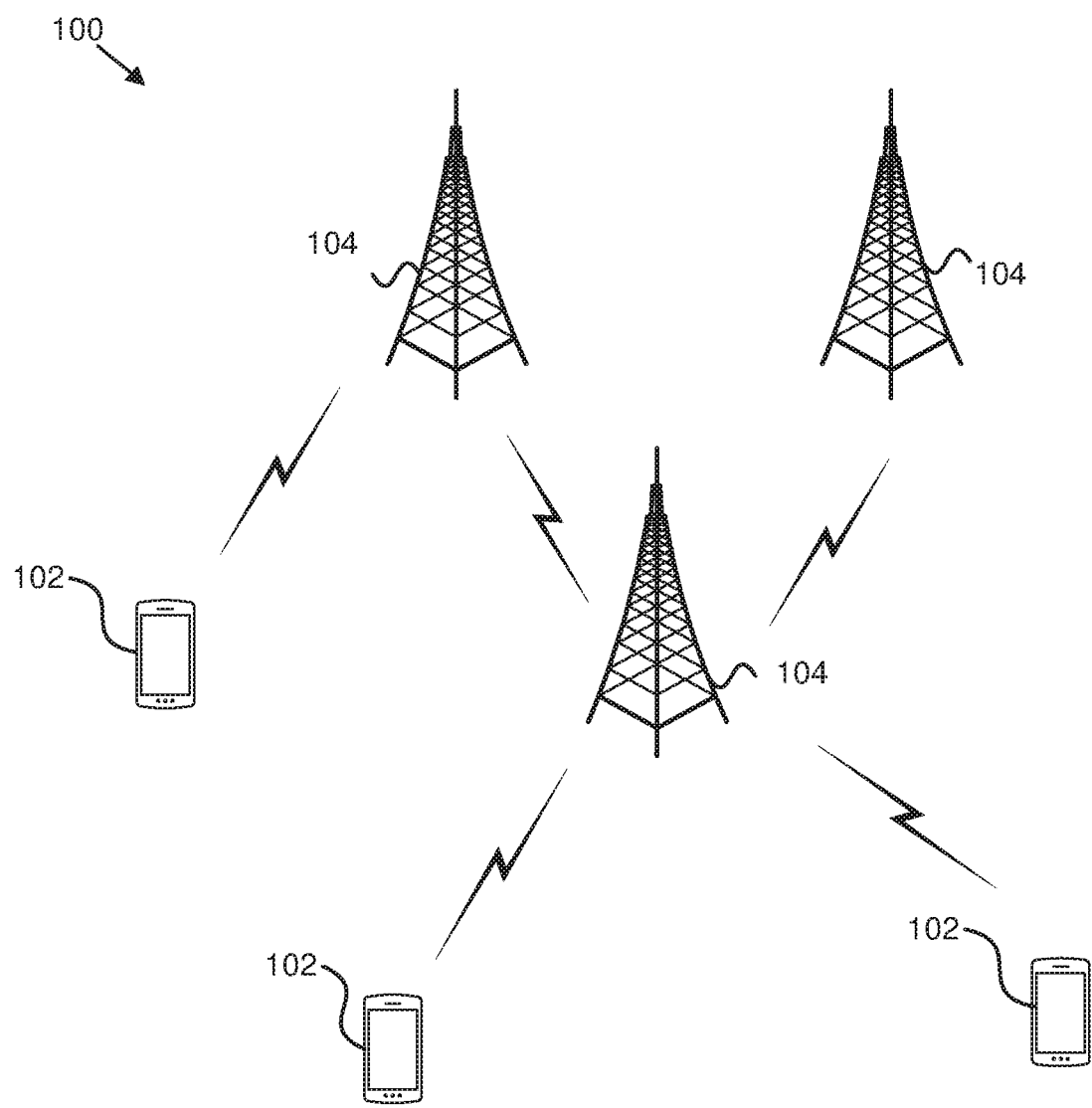
FIG. 1 is a schematic block diagram illustrating one embodiment of a wireless communication system for configuring uplink transmission configuration indication power control parameters.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring uplink transmission configuration indication power control parameters. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In some embodiments, a remote unit 102 (e.g., UE) may receive (e.g., from a network unit 104) a radio resource control message configuring a set of uplink transmission configuration indication power control parameter groups, wherein each uplink transmission configuration indication power control parameter group of the set of uplink transmission configuration indication power control parameter groups defines a group of power control parameters used to calculate an uplink transmission power. In certain embodiments, the remote unit 102 may receive downlink control information scheduling a codebook-based physical uplink shared channel transmission, wherein the downlink control information comprises an uplink transmission configuration indication field indicating at least one spatial domain transmission filter for the codebook-based physical uplink shared channel transmission. In various embodiments, the remote unit 102 may determine power control parameters for the codebook-based physical uplink shared channel transmission based on an uplink transmission configuration indication power control parameter group of the set of uplink transmission configuration indication power control parameter groups that corresponds to the uplink transmission configuration indication field. In some embodiments, the remote unit 102 may transmit the codebook-based physical uplink shared channel transmission with a transmission power determined based on the power control parameters. Accordingly, a remote unit 102 may be used for configuring uplink transmission configuration indication power control parameters.

In various embodiments, a network unit 104 may transmit, to a user equipment (e.g., remote unit 102), a radio resource control message configuring a set of uplink transmission configuration indication power control parameter groups, wherein each uplink transmission configuration indication power control parameter group of the set of uplink transmission configuration indication power control parameter groups defines a group of power control parameters used to calculate an uplink transmission power. In certain embodiments, the network unit 104 may transmit downlink control information scheduling a codebook-based physical uplink shared channel transmission, wherein the downlink control information comprises an uplink transmission configuration indication field indicating at least one spatial domain transmission filter for the codebook-based physical uplink shared channel transmission, and the user equipment determines power control parameters for the codebook-based physical uplink shared channel transmission based on an uplink transmission configuration indication power control parameter group of the set of uplink transmission configuration indication power control parameter groups that corresponds to the uplink transmission configuration indication field. In some embodiments, the network unit 104 may receive the codebook-based physical uplink shared channel transmission with a transmission power determined based on the power control parameters. Accordingly, a network unit 104 may be used for configuring uplink transmission configuration indication power control parameters.

Figure 2:
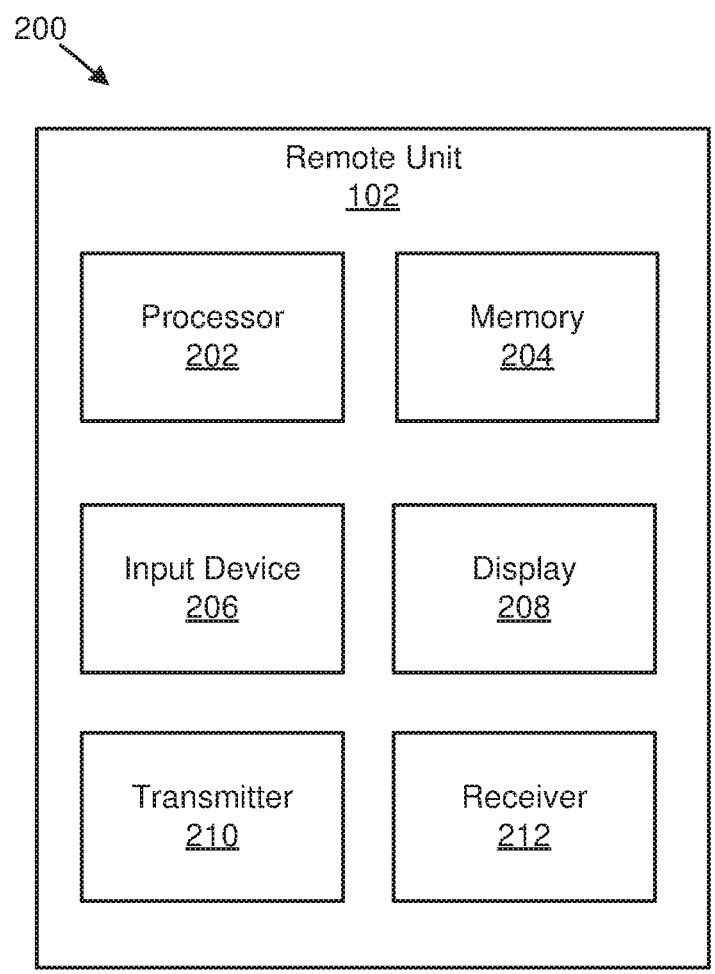
FIG. 2 is a schematic block diagram illustrating one embodiment of an apparatus that may be used for configuring uplink transmission configuration indication power control parameters.

FIG. 2 depicts one embodiment of an apparatus 200 that may be used for configuring uplink transmission configuration indication power control parameters. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the transmitter 210 may be used for transmitting information described herein and/or the receiver 212 may be used for receiving information described herein and/or the processor 202 may be used for processing information described herein.

In some embodiments, the receiver 212 may: receive a radio resource control message configuring a set of uplink transmission configuration indication power control parameter groups, wherein each uplink transmission configuration indication power control parameter group of the set of uplink transmission configuration indication power control parameter groups defines a group of power control parameters used to calculate an uplink transmission power; and receive downlink control information scheduling a codebook-based physical uplink shared channel transmission, wherein the downlink control information comprises an uplink transmission configuration indication field indicating at least one spatial domain transmission filter for the codebook-based physical uplink shared channel transmission. In certain embodiments, the processor 202 may determine power control parameters for the codebook-based physical uplink shared channel transmission based on an uplink transmission configuration indication power control parameter group of the set of uplink transmission configuration indication power control parameter groups that corresponds to the uplink transmission configuration indication field. In various embodiments, the transmitter 210 may transmit the codebook-based physical uplink shared channel transmission with a transmission power determined based on the power control parameters.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
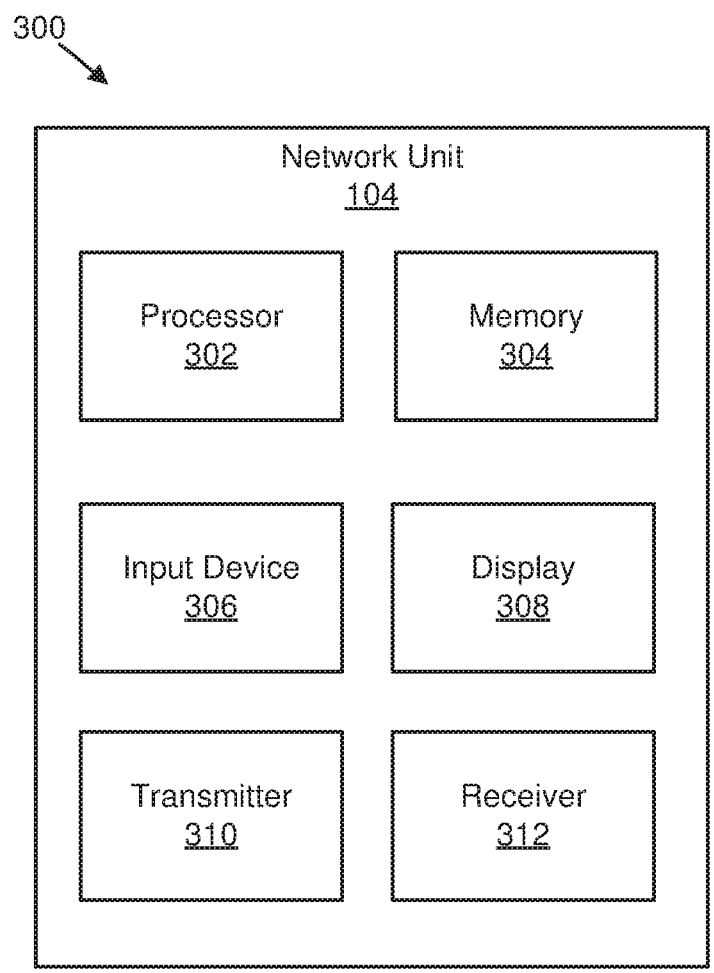
FIG. 3 is a schematic block diagram illustrating one embodiment of an apparatus that may be used for configuring uplink transmission configuration indication power control parameters.

FIG. 3 depicts one embodiment of an apparatus 300 that may be used for configuring uplink transmission configuration indication power control parameters. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 may: transmit, to a user equipment, a radio resource control message configuring a set of uplink transmission configuration indication power control parameter groups, wherein each uplink transmission configuration indication power control parameter group of the set of uplink transmission configuration indication power control parameter groups defines a group of power control parameters used to calculate an uplink transmission power; and transmit downlink control information scheduling a codebook-based physical uplink shared channel transmission, wherein the downlink control information comprises an uplink transmission configuration indication field indicating at least one spatial domain transmission filter for the codebook-based physical uplink shared channel transmission, and the user equipment determines power control parameters for the codebook-based physical uplink shared channel transmission based on an uplink transmission configuration indication power control parameter group of the set of uplink transmission configuration indication power control parameter groups that corresponds to the uplink transmission configuration indication field. In certain embodiments, the receiver 312 may receive the codebook-based physical uplink shared channel transmission with a transmission power determined based on the power control parameters.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, UL PUSCH transmission may be indicated by a DCI format (e.g., DCI format 0_1 or 0_2) which includes an SRI field. In such embodiments, the SRI field indicates SRS resources used for transmission. For codebook-based PUSCH transmissions, the SRI field indicates a single SRS resource with usage set to "codebook." For non-codebook based PUSCH transmissions, the SRI field indicates one or more single-port SRS resources with usage set to "nonCodebook." The SRS resources are configured with a transmission beam in the form of "spatialRelationInfo," which may be configured as a CSI-RS, an SSB, and/or an SRS. In certain embodiments, a UE uses spatialRelationInfo as a TX beam of a PUSCH transmission.

In various embodiments, an UL-TCI field in DCI (e.g., a DCI format) may be used to dynamically indicate an UL transmission beam for a PUSCH transmission. This UL-TCI field may facilitate decoupling an UL TX beam from SRS resources and may give a gNB more flexibility. In certain embodiments, a transmission power control scheme may be associated with SRS resources indicated by an SRI.

In some embodiments, a UE may be configured by RRC (e.g., RRC signaling) with a set of UL-TCI states for PUSCH transmission. In such embodiments, a subset of the set of UL-TCI states may be activated using a MAC-CE message that may be part of PUSCH scheduling DCI. Each UL-TCI state may contain at least one UL spatial relationship. An example of an UL-TCI state is shown in Table 1.

TABLE 1

```
UL-TCI-State ::= SEQUENCE {
    ul-tci-StateId ul-TCI-StateId,
    spatialRelation1 UL-spatial-Info,
    spatialRelation2 UL-spatial-Info, OPTIONAL, -- Need R
    ...
}
UL-spatial-Info ::= SEQUENCE {
    cell ServCellIndex OPTIONAL, -- Need R
    bwp-Id BWP-Id OPTIONAL, -- Cond CSI-RS-Indicated
    referenceSignal CHOICE {
        csi-rs NZP-CSI-RS-ResourceId,
        ssb SSB-Index ,
        srs SRS-ResourceId
    },
}
```

In various embodiments, to use an UL transmission beam indicated by UL-TCI, corresponding power control parameters (e.g., p0, alpha, pathloss reference RS, and/or closed loop index) may be used. In certain embodiments, power control parameters to be used for PUSCH transmissions are defined (e.g., in SRI-PUSCH-PowerControl) and may not be compatible with UL-TCI. In some embodiments, a set of power control parameters may be called upon by UL-TCI. In such embodiments, a set of power control parameter sets (e.g., UL-TCI-PUSCH-PowerControl) may be defined (e.g., in an RRC parameter PUSCH-PowerControl) and may have a corresponding entry called upon with an UL-TCI field in DCI that schedules a PUSCH transmission. In various embodiments, via a UL-TCI-PUSCH-PowerControl a UE is configured with a set of RRC parameters (e.g., including P0, alpha, a ClosedLoopIndex, and/or at least one PathlossReferenceRS-ID). On example of a UL-TCI-PUSCH-PowerControl is shown in Table 2.

TABLE 2

```
UL-TCI-PUSCH-PowerControl ::=      SEQUENCE {
    ul-tci-PUSCH-PowerControlId       UL-TCI-PUSCH-PowerControlId,
       ul-tci-PUSCH-PathlossReferenceRS-Id1   PUSCH-PathlossReferenceRS-Id,
       ul-tci-PUSCH-PathlossReferenceRS-Id2   PUSCH-PathlossReferenceRS-Id,
OPTIONAL, -- Need R
    ...
    ul-tci-P0-PUSCH-AlphaSetId        P0-PUSCH-AlphaSetId,
    ul-tci-PUSCH-ClosedLoopIndex      ENUMERATED { i0, i1 }
}
UL-TCI-PUSCH-PowerControlId ::=    INTEGER (0..maxNrofUL-TCI-PUSCH-Mappings-1)
```

In some embodiments, a defined PUSCH-PathlossReferenceRS-ID and/or P0-PUSCH-AlphaSetID may be used. In certain embodiments, a CSI-RS resource or a SSB may be configured as a pathloss reference RS. In various embodiments, a number of pathloss reference RS (e.g., PathlossReferenceRS) included in a UL-TCI-PUSCH-PowerControl may match a number of UL spatial relationships in a corresponding UL-TCI state.

In various embodiments, a UL-TCI-PUSCH-PowerControlId field may be used for UL-TCI-PUSCH-PowerControl to be used with a UL-TCI-State with the same UL-TCI-StateId configured in RRC (e.g., via RRC signaling). In some embodiments, a UL-TCI-PUSCH-PowerControl with a UL-TCI-PUSCH-PowerControlId may be used with a UL-TCI-State with the same MAC-CE activated ID. If a PUSCH transmission is scheduled with UL-TCI, power control parameters (e.g., including p0 and/or alpha from a corresponding P0-PUSCH-AlphasSetID, one or more pathloss reference RSs such a PUSCH-PathlossReferenceRS-Id, and a PUSCH closed loop index such as UL-TCI-PUSCH-ClosedLoopIndex in a corresponding UL-TCI-PUSCH-PowerControl may be used for computing an UL TX power. If an UL-TCI field points to a codepoint UL-TCI-PUSCH-PowerControl that has not been defined, and if the DCI scheduling the PUSCH has an SRI field, the parameters in the SRI-PUSCH-PowerControl corresponding to the SRI field may be used.

In certain embodiments, power control parameters may be defined as part of an UL-TCI state. One example of such an UL-TCI state is shown in Table 3.

TABLE 3

```
UL-TCI-State ::= SEQUENCE {
    ul-tci-StateId ul-TCI-StateId,
    spatialRelation1 UL-spatial-Info,
    spatialRelation2 UL-spatial-Info, OPTIONAL, -- Need R
    ...
    ul-tci-PUSCH-PowerControl      UL-TCI-PUSCH-PowerControlId
}
UL-spatial-Info ::= SEQUENCE {
    cell ServCellIndex OPTIONAL, -- Need R
    bwp-Id BWP-Id OPTIONAL, -- Cond CSI-RS-Indicated
    referenceSignal CHOICE {
        csi-rs NZP-CSI-RS-ResourceId,
        ssb SSB-Index ,
        srs SRS-ResourceId
    },
}
```

In Table 3, the definition of UL-TCI-PUSCH-PowerControl is used as in other embodiments. If an UL-TCI-State is called upon by an UL-TCI field in DCI, the UL-TCI-PUSCH-PowerControl of the UL-TCI-State may be used.

In various embodiments, PUSCH power control parameters in UL-TCI-State may be defined as shown in Table 4.

TABLE 4

```
UL-TCI-State ::= SEQUENCE {
    ul-tci-StateId ul-TCI-StateId,
    spatialRelation1 UL-spatial-Info,
    spatialRelation2 UL-spatial-Info, OPTIONAL, -- Need R
    ...
    ul-tci-PUSCH-PathlossReferenceRS-Id1   PUSCH-
    PathlossReferenceRS-Id,
    ul-tci-PUSCH-PathlossReferenceRS-Id2   PUSCH-
    PathlossReferenceRS-Id, OPTIONAL, -- Need R
    ...
    ul-tci-P0-PUSCH-AlphaSetId        P0-PUSCH-AlphaSetId,
    ul-tci-PUSCH-ClosedLoopIndex      ENUMERATED { i0, i1 }
}
UL-spatial-Info ::= SEQUENCE {
    cell ServCellIndex OPTIONAL, -- Need R
    bwp-Id BWP-Id OPTIONAL, -- Cond CSI-RS-Indicated
    referenceSignal CHOICE {
        csi-rs NZP-CSI-RS-ResourceId,
        ssb SSB-Index ,
        srs SRS-ResourceId
    },
}
```

In various embodiments, if an UL-TCI state includes N (e.g., >1) spatial relation information, then a power control parameter set includes N pathloss reference RSs, and each pathloss reference RS may be applied to an UL transmission power computation of the corresponding UL TX beam (e.g., spatial relation). Thus, there is 1-to-1 relationship between the spatial relation information and the pathloss reference RS. In certain embodiments, if there are multiple UL spatial relation information (e.g., UL TX beams) in UL-TCI, a PUSCH transmission is transmitted multiple times, each time with a different UL TX beam. The TX power for different UL TX beams is different because their pathloss reference RSs are different. Thus, each UL TX beam has its own pathloss reference RS. In such embodiments, the same parameters (e.g., p0, alpha, and/or closedLoopIndex) are applied to all UL TX beams. For example, if an UL-TCI state has N>1 spatial relations, the N pathloss reference RS in UL-TCI-PUSCH-PowerControl are one-one mapped to the spatial relations, and one set of parameters (e.g., p0, alpha, and/or closedLoopIndex) apply to all of the N UL spatial relations.

In some embodiments, if a UL-TCI field is used in a DCI format to indicate to a UE a transmission spatial relationship (e.g., spatial transmission filter) to use for a PUSCH transmission, power control parameters (e.g., p0, alpha, pathloss reference RS, and/or closed loop index) from a corresponding UL-TCI-PUSCH-PowerControl may be used. Such embodiments may make an UL power control mechanism compatible with an UL TX beam indication with UL-TCI.

Figure 4:
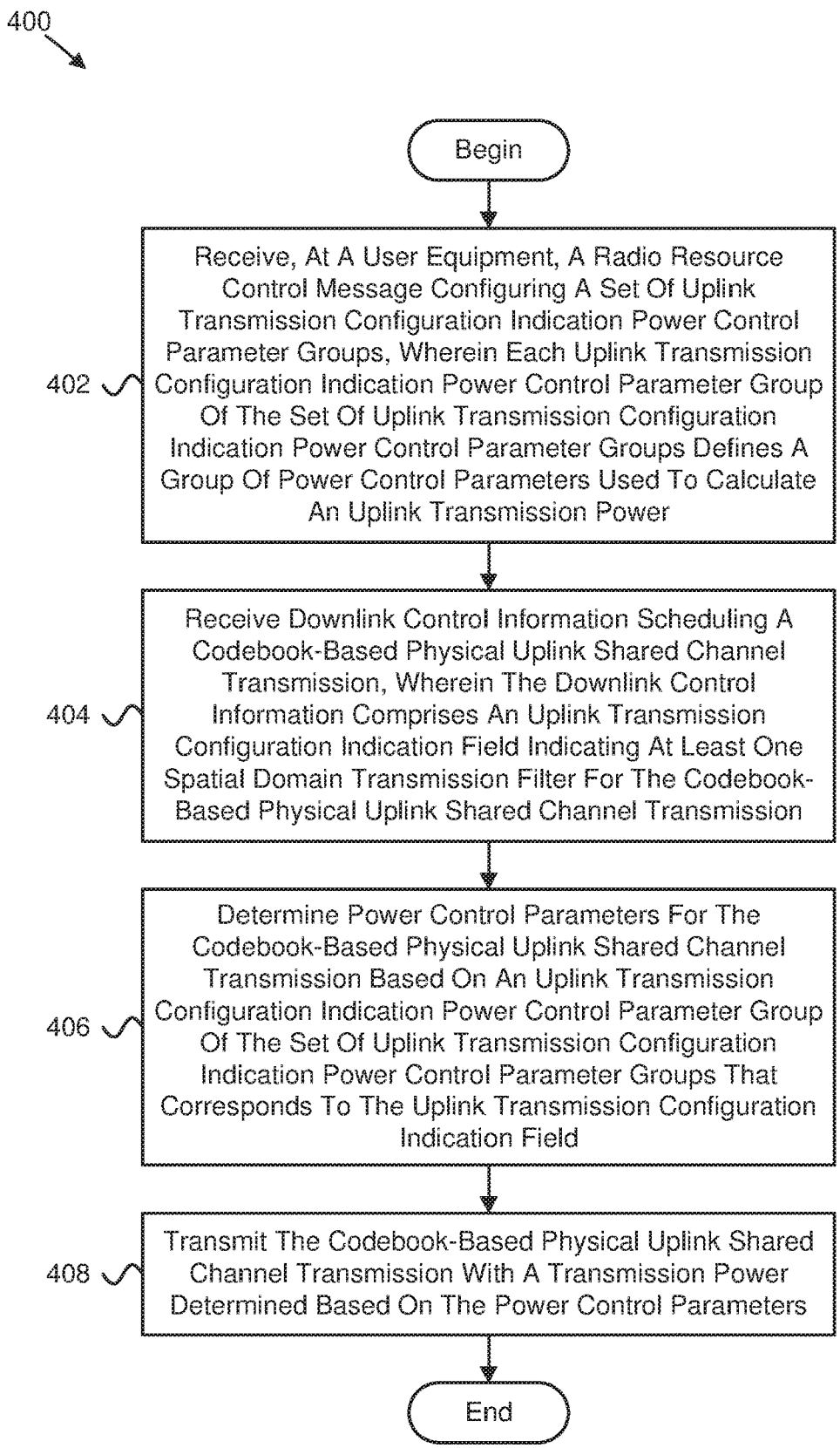
FIG. 4 is a flow chart diagram illustrating one embodiment of a method for configuring uplink transmission configuration indication power control parameters.

FIG. 4 is a schematic flow chart diagram illustrating one embodiment of a method 400 for configuring uplink transmission configuration indication power control parameters. In some embodiments, the method 400 is performed by an apparatus, such as the remote unit 102 (e.g., UE). In certain embodiments, the method 400 may be performed by a processor executing program code, for example, a microcontroller, a microprocessor, a CPU, a GPU, an auxiliary processing unit, a FPGA, or the like.

The method 400 may include receiving 402 a radio resource control message configuring a set of uplink transmission configuration indication power control parameter groups, wherein each uplink transmission configuration indication power control parameter group of the set of uplink transmission configuration indication power control parameter groups defines a group of power control parameters used to calculate an uplink transmission power. In certain embodiments, the method 400 may include receiving 404 downlink control information scheduling a codebook-based physical uplink shared channel transmission, wherein the downlink control information comprises an uplink transmission configuration indication field indicating at least one spatial domain transmission filter for the codebook-based physical uplink shared channel transmission. In some embodiments, the method 400 may include determining 406 power control parameters for the codebook-based physical uplink shared channel transmission based on an uplink transmission configuration indication power control parameter group of the set of uplink transmission configuration indication power control parameter groups that corresponds to the uplink transmission configuration indication field. In various embodiments, the method 400 may include transmitting 408 the codebook-based physical uplink shared channel transmission with a transmission power determined based on the power control parameters.

In certain embodiments, the power control parameters comprise p0, alpha, at least one pathloss reference signal, a closed loop index, or some combination thereof. In some embodiments, the at least one pathloss reference signal comprises a channel state information reference signal, a synchronization signal block, or a combination thereof. In various embodiments, the uplink transmission configuration indication power control parameter group is defined as part of an uplink transmission configuration indication state. In one embodiment, the power control parameters are defined as part of an uplink transmission configuration indication state.

In certain embodiments, in response to the uplink transmission configuration indication field indicating a plurality of spatial domain transmission filters for the codebook-based physical uplink shared channel transmission, each spatial domain transmission filter of the plurality of spatial domain transmission filters is mapped to an uplink transmission configuration indication power control parameter group of the set of uplink transmission configuration indication power control parameter groups. In some embodiments, each spatial domain transmission filter of the plurality of spatial domain transmission filters uses the same p0, alpha, and closed loop index, and a respective pathloss reference signal of a plurality of pathloss reference signals.

Figure 5:
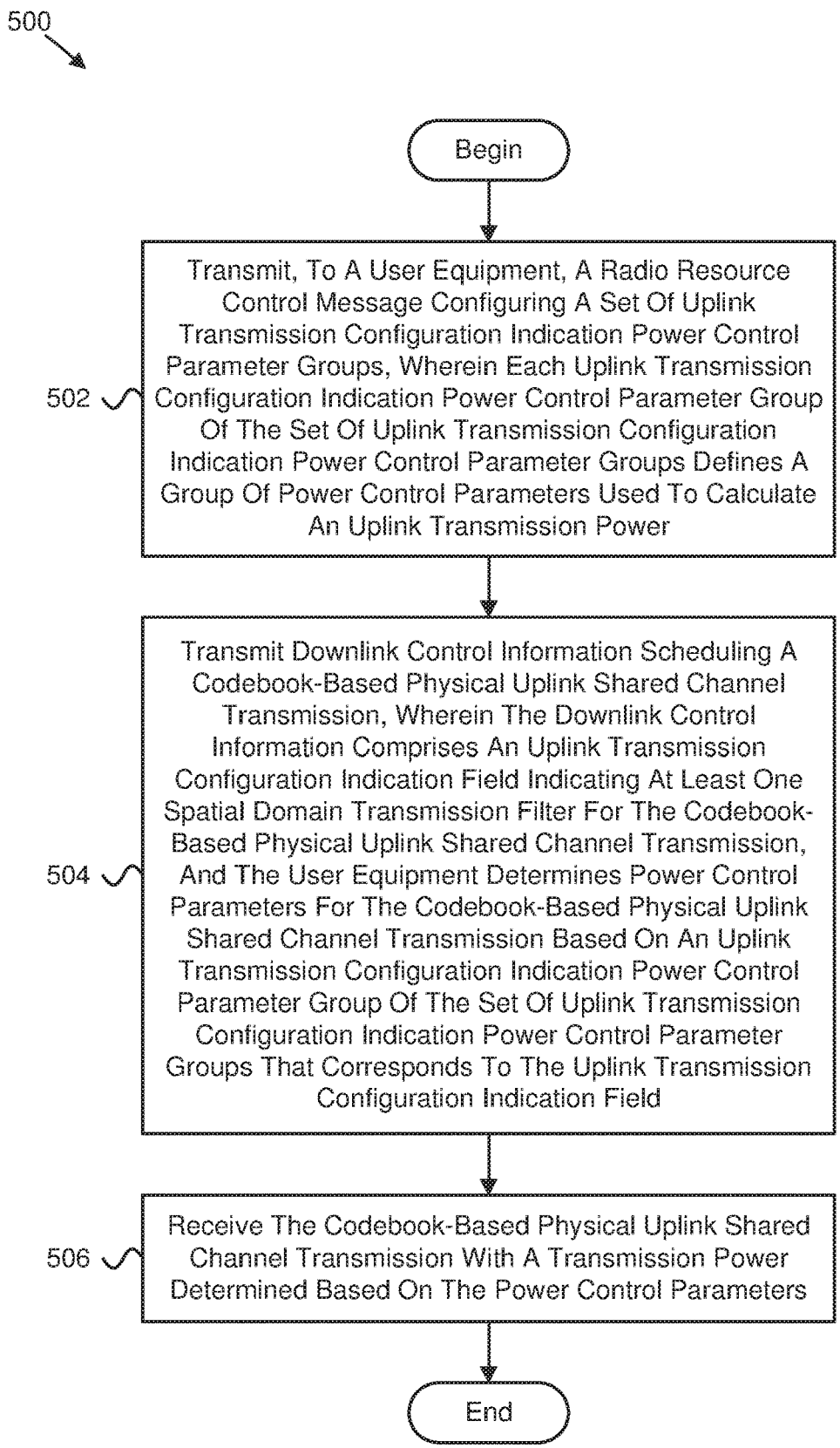
FIG. 5 is a flow chart diagram illustrating another embodiment of a method for configuring uplink transmission configuration indication power control parameters.

FIG. 5 is a schematic flow chart diagram illustrating one embodiment of a method 500 for configuring uplink transmission configuration indication power control parameters. In some embodiments, the method 500 is performed by an apparatus, such as the network unit 104. In certain embodiments, the method 500 may be performed by a processor executing program code, for example, a microcontroller, a microprocessor, a CPU, a GPU, an auxiliary processing unit, a FPGA, or the like.

The method 500 may include transmitting 502, to a user equipment (e.g., remote unit 102), a radio resource control message configuring a set of uplink transmission configuration indication power control parameter groups, wherein each uplink transmission configuration indication power control parameter group of the set of uplink transmission configuration indication power control parameter groups defines a group of power control parameters used to calculate an uplink transmission power. In certain embodiments, the method 500 may include transmitting 504 downlink control information scheduling a codebook-based physical uplink shared channel transmission, wherein the downlink control information comprises an uplink transmission configuration indication field indicating at least one spatial domain transmission filter for the codebook-based physical uplink shared channel transmission, and the user equipment determines power control parameters for the codebook-based physical uplink shared channel transmission based on an uplink transmission configuration indication power control parameter group of the set of uplink transmission configuration indication power control parameter groups that corresponds to the uplink transmission configuration indication field. In some embodiments, the method 500 may include receiving 506 the codebook-based physical uplink shared channel transmission with a transmission power determined based on the power control parameters.

In certain embodiments, the power control parameters comprise p0, alpha, at least one pathloss reference signal, a closed loop index, or some combination thereof. In some embodiments, the at least one pathloss reference signal comprises a channel state information reference signal, a synchronization signal block, or a combination thereof. In various embodiments, the uplink transmission configuration indication power control parameter group is defined as part of an uplink transmission configuration indication state. In one embodiment, the power control parameters are defined as part of an uplink transmission configuration indication state.

In certain embodiments, in response to the uplink transmission configuration indication field indicating a plurality of spatial domain transmission filters for the codebook-based physical uplink shared channel transmission, each spatial domain transmission filter of the plurality of spatial domain transmission filters is mapped to an uplink transmission configuration indication power control parameter group of the set of uplink transmission configuration indication power control parameter groups. In some embodiments, each spatial domain transmission filter of the plurality of spatial domain transmission filters uses the same p0, alpha, and closed loop index, and a respective pathloss reference signal of a plurality of pathloss reference signals.

In one embodiment, a method comprises: receiving, at a user equipment, a radio resource control message configuring a set of uplink transmission configuration indication power control parameter groups, wherein each uplink transmission configuration indication power control parameter group of the set of uplink transmission configuration indication power control parameter groups defines a group of power control parameters used to calculate an uplink transmission power; receiving downlink control information scheduling a codebook-based physical uplink shared channel transmission, wherein the downlink control information comprises an uplink transmission configuration indication field indicating at least one spatial domain transmission filter for the codebook-based physical uplink shared channel transmission; determining power control parameters for the codebook-based physical uplink shared channel transmission based on an uplink transmission configuration indication power control parameter group of the set of uplink transmission configuration indication power control parameter groups that corresponds to the uplink transmission configuration indication field; and transmitting the codebook-based physical uplink shared channel transmission with a transmission power determined based on the power control parameters.

In certain embodiments, the power control parameters comprise p0, alpha, at least one pathloss reference signal, a closed loop index, or some combination thereof.

In some embodiments, the at least one pathloss reference signal comprises a channel state information reference signal, a synchronization signal block, or a combination thereof.

In various embodiments, the uplink transmission configuration indication power control parameter group is defined as part of an uplink transmission configuration indication state.

In one embodiment, the power control parameters are defined as part of an uplink transmission configuration indication state.

In certain embodiments, in response to the uplink transmission configuration indication field indicating a plurality of spatial domain transmission filters for the codebook-based physical uplink shared channel transmission, each spatial domain transmission filter of the plurality of spatial domain transmission filters is mapped to an uplink transmission configuration indication power control parameter group of the set of uplink transmission configuration indication power control parameter groups.

In some embodiments, each spatial domain transmission filter of the plurality of spatial domain transmission filters uses the same p0, alpha, and closed loop index, and a respective pathloss reference signal of a plurality of pathloss reference signals.

In one embodiment, an apparatus comprises: a receiver that: receives a radio resource control message configuring a set of uplink transmission configuration indication power control parameter groups, wherein each uplink transmission configuration indication power control parameter group of the set of uplink transmission configuration indication power control parameter groups defines a group of power control parameters used to calculate an uplink transmission power; and receives downlink control information scheduling a codebook-based physical uplink shared channel transmission, wherein the downlink control information comprises an uplink transmission configuration indication field indicating at least one spatial domain transmission filter for the codebook-based physical uplink shared channel transmission; a processor that determines power control parameters for the codebook-based physical uplink shared channel transmission based on an uplink transmission configuration indication power control parameter group of the set of uplink transmission configuration indication power control parameter groups that corresponds to the uplink transmission configuration indication field; and a transmitter that transmits the codebook-based physical uplink shared channel transmission with a transmission power determined based on the power control parameters.

In certain embodiments, the power control parameters comprise p0, alpha, at least one pathloss reference signal, a closed loop index, or some combination thereof.

In some embodiments, the at least one pathloss reference signal comprises a channel state information reference signal, a synchronization signal block, or a combination thereof.

In various embodiments, the uplink transmission configuration indication power control parameter group is defined as part of an uplink transmission configuration indication state.

In one embodiment, the power control parameters are defined as part of an uplink transmission configuration indication state.

In certain embodiments, in response to the uplink transmission configuration indication field indicating a plurality of spatial domain transmission filters for the codebook-based physical uplink shared channel transmission, each spatial domain transmission filter of the plurality of spatial domain transmission filters is mapped to an uplink transmission configuration indication power control parameter group of the set of uplink transmission configuration indication power control parameter groups.

In some embodiments, each spatial domain transmission filter of the plurality of spatial domain transmission filters uses the same p0, alpha, and closed loop index, and a respective pathloss reference signal of a plurality of pathloss reference signals.

In one embodiment, a method comprises: transmitting, to a user equipment, a radio resource control message configuring a set of uplink transmission configuration indication power control parameter groups, wherein each uplink transmission configuration indication power control parameter group of the set of uplink transmission configuration indication power control parameter groups defines a group of power control parameters used to calculate an uplink transmission power; transmitting downlink control information scheduling a codebook-based physical uplink shared channel transmission, wherein the downlink control information comprises an uplink transmission configuration indication field indicating at least one spatial domain transmission filter for the codebook-based physical uplink shared channel transmission, and the user equipment determines power control parameters for the codebook-based physical uplink shared channel transmission based on an uplink transmission configuration indication power control parameter group of the set of uplink transmission configuration indication power control parameter groups that corresponds to the uplink transmission configuration indication field; and receiving the codebook-based physical uplink shared channel transmission with a transmission power determined based on the power control parameters.

In certain embodiments, the power control parameters comprise p0, alpha, at least one pathloss reference signal, a closed loop index, or some combination thereof.

In some embodiments, the at least one pathloss reference signal comprises a channel state information reference signal, a synchronization signal block, or a combination thereof.

In various embodiments, the uplink transmission configuration indication power control parameter group is defined as part of an uplink transmission configuration indication state.

In one embodiment, the power control parameters are defined as part of an uplink transmission configuration indication state.

In certain embodiments, in response to the uplink transmission configuration indication field indicating a plurality of spatial domain transmission filters for the codebook-based physical uplink shared channel transmission, each spatial domain transmission filter of the plurality of spatial domain transmission filters is mapped to an uplink transmission configuration indication power control parameter group of the set of uplink transmission configuration indication power control parameter groups.

In some embodiments, each spatial domain transmission filter of the plurality of spatial domain transmission filters uses the same p0, alpha, and closed loop index, and a respective pathloss reference signal of a plurality of pathloss reference signals.

In one embodiment, an apparatus comprises: a transmitter that: transmits, to a user equipment, a radio resource control message configuring a set of uplink transmission configuration indication power control parameter groups, wherein each uplink transmission configuration indication power control parameter group of the set of uplink transmission configuration indication power control parameter groups defines a group of power control parameters used to calculate an uplink transmission power; and transmits downlink control information scheduling a codebook-based physical uplink shared channel transmission, wherein the downlink control information comprises an uplink transmission configuration indication field indicating at least one spatial domain transmission filter for the codebook-based physical uplink shared channel transmission, and the user equipment determines power control parameters for the codebook-based physical uplink shared channel transmission based on an uplink transmission configuration indication power control parameter group of the set of uplink transmission configuration indication power control parameter groups that corresponds to the uplink transmission configuration indication field; and a receiver that receives the codebook-based physical uplink shared channel transmission with a transmission power determined based on the power control parameters.

In certain embodiments, the power control parameters comprise p0, alpha, at least one pathloss reference signal, a closed loop index, or some combination thereof.

In some embodiments, the at least one pathloss reference signal comprises a channel state information reference signal, a synchronization signal block, or a combination thereof.

In various embodiments, the uplink transmission configuration indication power control parameter group is defined as part of an uplink transmission configuration indication state.

In one embodiment, the power control parameters are defined as part of an uplink transmission configuration indication state.

In certain embodiments, in response to the uplink transmission configuration indication field indicating a plurality of spatial domain transmission filters for the codebook-based physical uplink shared channel transmission, each spatial domain transmission filter of the plurality of spatial domain transmission filters is mapped to an uplink transmission configuration indication power control parameter group of the set of uplink transmission configuration indication power control parameter groups.

In some embodiments, each spatial domain transmission filter of the plurality of spatial domain transmission filters uses the same p0, alpha, and closed loop index, and a respective pathloss reference signal of a plurality of pathloss reference signals.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
  receiving a radio resource control (RRC) message configuring a set of uplink transmission configuration indication (TCI) power control parameter groups, wherein each uplink TCI power control parameter group of the set of uplink TCI power control parameter groups defines a group of power control parameters used to calculate an uplink transmission power;
  receiving downlink control information (DCI) scheduling a codebook-based physical uplink shared channel (PUSCH) transmission, wherein the DCI comprises an uplink TCI field indicating at least one spatial domain transmission filter for the codebook-based PUSCH transmission;
  determining power control parameters for the codebook-based PUSCH transmission based on an uplink TCI power control parameter group of the set of uplink TCI power control parameter groups that corresponds to the uplink TCI field; and
  transmitting the codebook-based PUSCH transmission with a transmission power determined based on the power control parameters, wherein, in response to the uplink TCI field indicating a plurality of spatial domain transmission filters for the codebook-based PUSCH transmission, each spatial domain transmission filter of the plurality of spatial domain transmission filters is mapped to an uplink TCI power control parameter group of the set of uplink TCI power control parameter groups.

2. The method of claim 1, wherein the power control parameters comprise one or more of p0, alpha, at least one pathloss reference signal, or a closed loop index.

3. The method of claim 2, wherein the at least one pathloss reference signal comprises a channel state information (CSI) reference signal (RS), or a synchronization signal block (SSB), or both.

4. The method of claim 1, wherein the uplink TCI power control parameter group is defined as part of an uplink TCI state.

5. The method of claim 1, wherein the power control parameters are defined as part of an uplink TCI state.

6. The method of claim 1, wherein each spatial domain transmission filter of the plurality of spatial domain transmission filters uses the same p0, alpha, and closed loop index, and a respective pathloss reference signal of a plurality of pathloss reference signals.

7. A user equipment (UE), comprising:
  at least one memory; and
  at least one processor coupled with the at least one memory and configured to cause the UE to:
    receive a radio resource control (RRC) message configuring a set of uplink transmission configuration indication (TCI) power control parameter groups, wherein each uplink TCI power control parameter group of the set of uplink TCI power control parameter groups defines a group of power control parameters used to calculate an uplink transmission power;
    receive downlink control information (DCI) scheduling a codebook-based physical uplink shared channel (PUSCH) transmission, wherein the DCI comprises an uplink TCI field indicating at least one spatial domain transmission filter for the codebook-based PUSCH transmission;

determine power control parameters for the codebook-based PUSCH transmission based on an uplink TCI power control parameter group of the set of uplink TCI power control parameter groups that corresponds to the uplink TCI field; and transmit the codebook-based PUSCH transmission with a transmission power determined based on the power control parameters, wherein, in response to the uplink TCI field indicating a plurality of spatial domain transmission filters for the codebook-based PUSCH transmission, each spatial domain transmission filter of the plurality of spatial domain transmission filters is mapped to an uplink TCI power control parameter group of the set of uplink TCI power control parameter groups.

8. The UE of claim 7, wherein the power control parameters comprise one or more of p0, alpha, at least one pathloss reference signal, or a closed loop index.

9. The UE of claim 8, wherein the at least one pathloss reference signal comprises a channel state information (CSI) reference signal (RS), or a synchronization signal block (SSB), or both.

10. The UE of claim 7, wherein the uplink TCI power control parameter group is defined as part of an uplink TCI state.

11. The UE of claim 7, wherein the power control parameters are defined as part of an uplink TCI state.

12. The UE of claim 7, wherein each spatial domain transmission filter of the plurality of spatial domain transmission filters uses the same p0, alpha, and closed loop index, and a respective pathloss reference signal of a plurality of pathloss reference signals.

13. An apparatus A base station, comprising:
at least one memory; and
at least one processor coupled with the at least one memory and configured to cause the base station to:
transmit, to a user equipment (UE), a radio resource control (RRC) message configuring a set of uplink transmission configuration indication (TCI) power control parameter groups, wherein each uplink TCI power control parameter group of the set of uplink TCI power control parameter groups defines a group of power control parameters used to calculate an uplink transmission power;
transmit downlink control information (DCI) scheduling a codebook-based physical uplink shared channel (PUSCH) transmission, wherein the DCI comprises an uplink TCI field indicating at least one spatial domain transmission filter for the codebook-based PUSCH transmission, and the UE determines power control parameters for the codebook-based PUSCH transmission based on an uplink TCI power control parameter group of the set of uplink TCI power control parameter groups that corresponds to the uplink TCI field; and receive the codebook-based PUSCH transmission with a transmission power determined based on the power control parameters, wherein, in response to the uplink TCI field indicating a plurality of spatial domain transmission filters for the codebook-based PUSCH transmission, each spatial domain transmission filter of the plurality of spatial domain transmission filters is mapped to an uplink TCI power control parameter group of the set of uplink TCI power control parameter groups.

14. The base station of claim 13, wherein the power control parameters comprise one or more of p0, alpha, at least one pathloss reference signal, or a closed loop index.

15. The base station of claim 14, wherein the at least one pathloss reference signal comprises a channel state information (CSI) reference signal (RS), or a synchronization signal block (SSB), or both.

16. The base station of claim 13, wherein the uplink TCI power control parameter group is defined as part of an uplink TCI state.

17. The base station of claim 13, wherein the power control parameters are defined as part of an uplink TCI state.

18. A processor for wireless communication, comprising:
at least one controller coupled with at least one memory and configured to cause the processor to:
receive a radio resource control (RRC) message configuring a set of uplink transmission configuration indication (TCI) power control parameter groups, wherein each uplink TCI power control parameter group of the set of uplink TCI power control parameter groups defines a group of power control parameters used to calculate an uplink transmission power;
receive downlink control information (DCI) scheduling a codebook-based physical uplink shared channel (PUSCH) transmission, wherein the DCI comprises an uplink TCI field indicating at least one spatial domain transmission filter for the codebook-based PUSCH transmission;
determine power control parameters for the codebook-based PUSCH transmission based on an uplink TCI power control parameter group of the set of uplink TCI power control parameter groups that corresponds to the uplink TCI field; and
transmit the codebook-based PUSCH transmission with a transmission power determined based on the power control parameters, wherein, in response to the uplink TCI field indicating a plurality of spatial domain transmission filters for the codebook-based PUSCH transmission, each spatial domain transmission filter of the plurality of spatial domain transmission filters is mapped to an uplink TCI power control parameter group of the set of uplink TCI power control parameter groups.

* * * * *